(No Model.) 4 Sheets—Sheet 2.
L. B. WHITE.
PLOW.
No. 339,508. Patented Apr. 6, 1886.
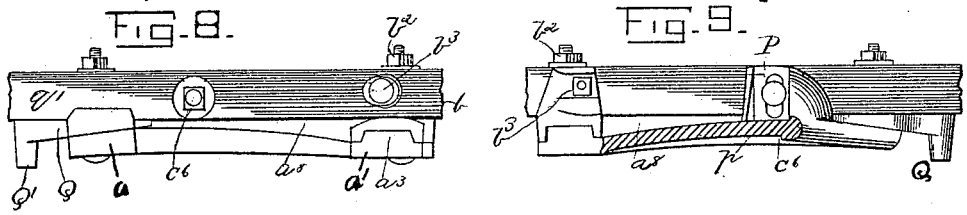
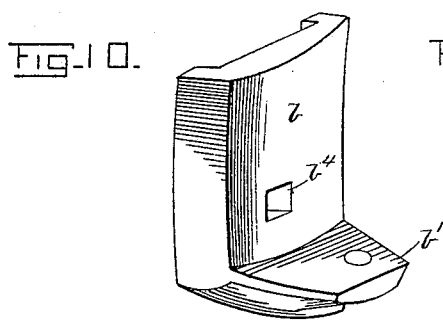
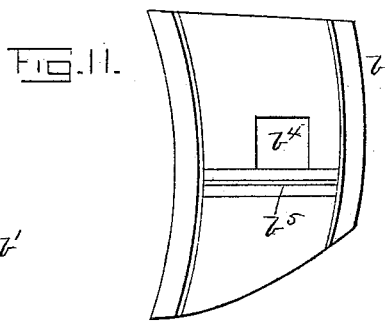
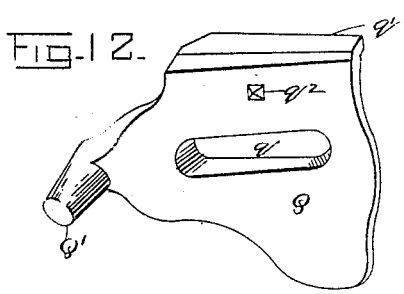
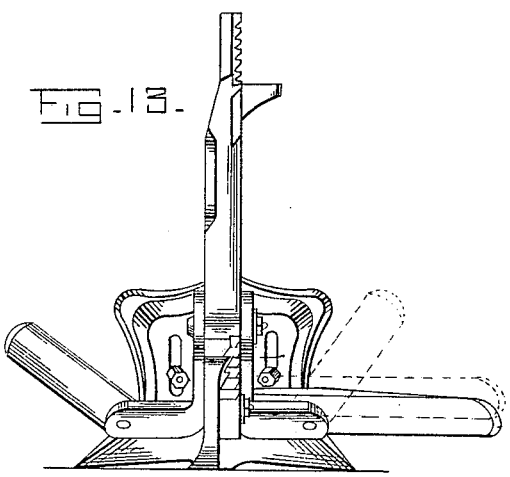
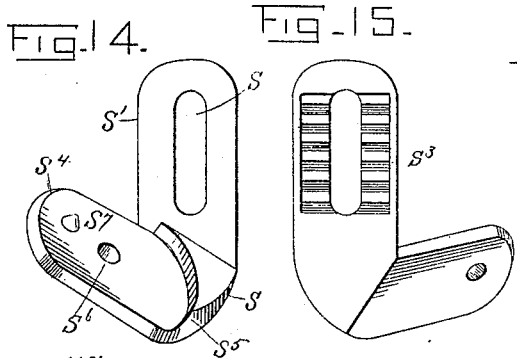
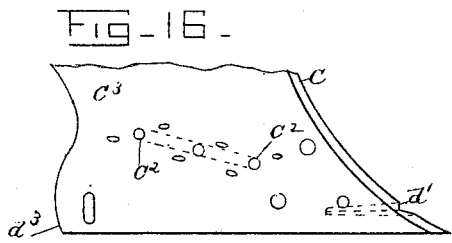
Witnesses:
Norris A. Clark
R. W. Bishop.
Inventor:
Lewis B. White
By his Attorneys:
R. S. & A. P. Lacey (No Model.)  4 Sheets—Sheet 3.
L. B. WHITE.
PLOW.
No. 339,508.  Patented Apr. 6, 1886.
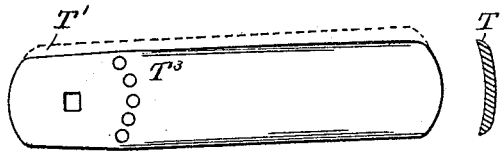
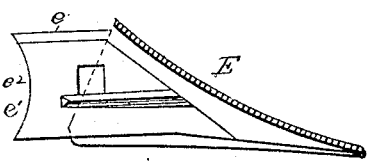
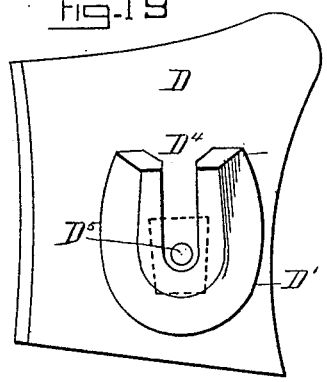
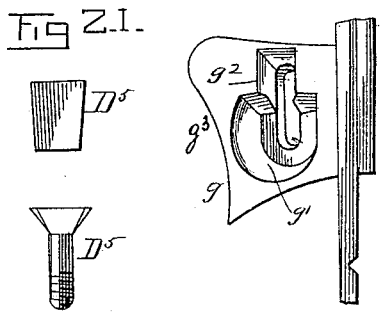
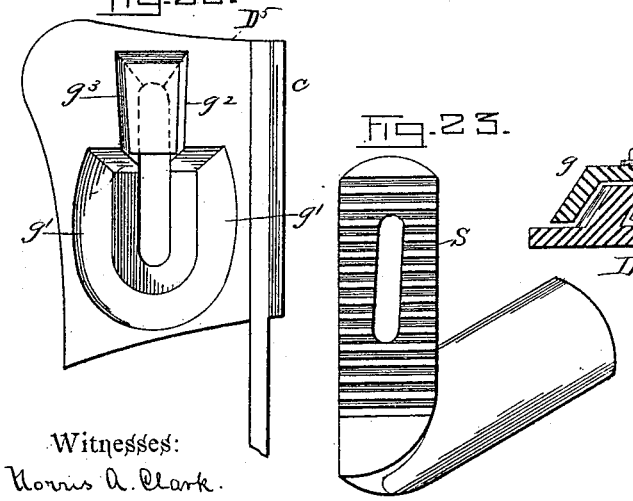
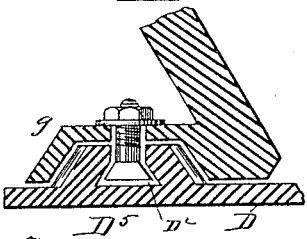
Witnesses:
Norris A. Clark.
R. W. Bishop.
Inventor:
Lewis B. White
By his Attorneys:
R. S. & A. P. Lacey (No Model.)  L. B. WHITE.  4 Sheets—Sheet 4.
PLOW.
No. 339,508. Patented Apr. 6, 1886.
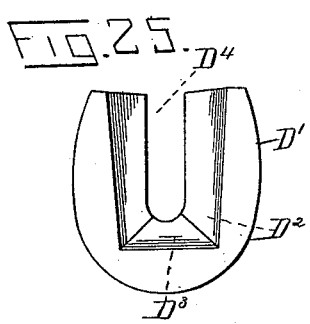
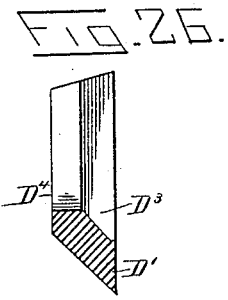
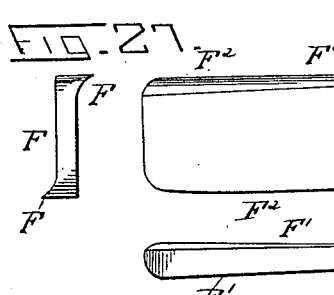
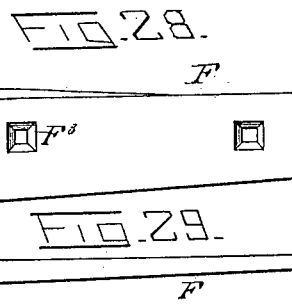
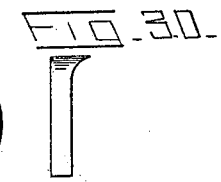
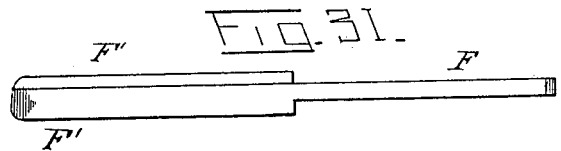
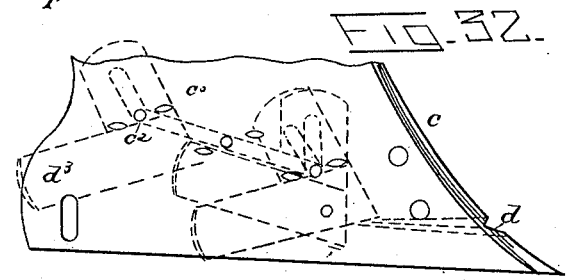
Witnesses:
Norris A. Clark.
R. H. Bishop.
Inventor:
Lewis B. White
By his Attorneys:
R.S. & A.P. Lacey

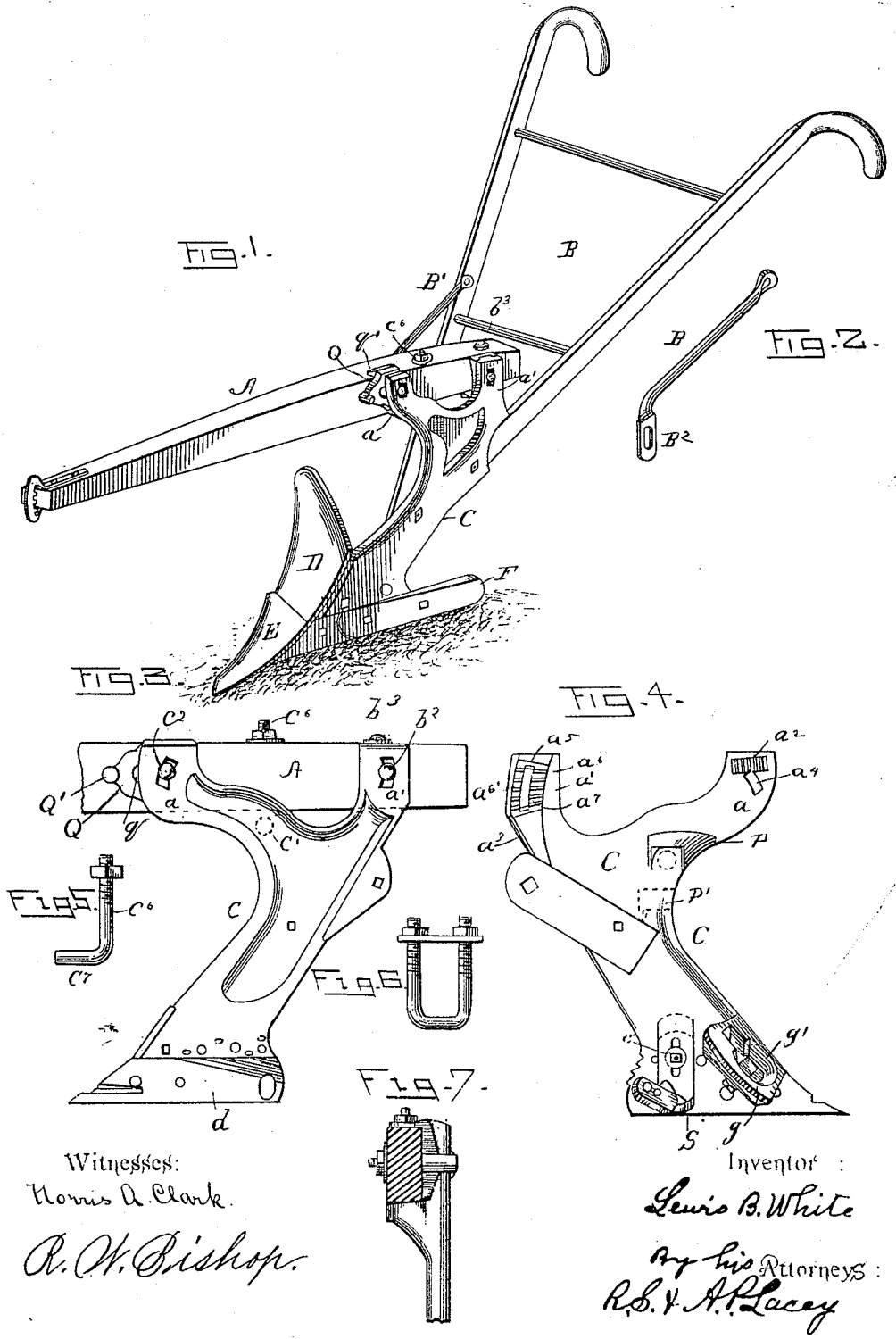

UNITED STATES PATENT OFFICE.

LEWIS B. WHITE, OF NORFOLK, VIRGINIA.

PLOW.

SPECIFICATION forming part of Letters Patent No. 339,508, dated April 6, 1886.

Application filed November 6, 1885. Serial No. 181,035. (No model.)

*To all whom it may concern:*

Be it known that I, LEWIS B. WHITE, a citizen of the United States, residing at Norfolk, in the county of Norfolk and State of Virginia, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention consists in the construction and operation of the several parts hereinafter described, and pointed out in the claims.

In the drawings, Figure 1 is a perspective of a single turn-plow, showing a part of my improvements. Fig. 2 is a brace-rod for holding the handles. Figs. 3 and 4 are views of reverse sides of my improved standard. Figs. 5 and 6 show modified forms of beam-rests. Fig. 7 is a front edge view of the upper end of the standard applied to the beam. Fig. 8 is a top plan view of the standard and beam. Fig. 9 is a view of the under side of the beam, the standard being in section. Figs. 10 and 11 show the ratchet-slide. Fig. 12 is my improved adjusting-wedge. Fig. 13 is a rear elevation of a double turn-plow having a part of my improvements attached thereto. Figs. 14 and 15 are detail views of the sweep-stock. Fig. 16 is a side view of the lower end of the standard. Fig. 17 is my improved sweep. Fig. 18 is my improved share, partly in section. Fig. 19 shows the under side of a removable mold-board. Fig. 20 is a perspective of one of the breasts of the standard. Fig. 21 is my improved bolt for plows. Fig. 22 shows the elongated socket in the breast and a bolt slipped into the elongation. Fig. 23 is the sweep and its stock made integral. Fig. 24 shows in section a mold-board or other removable piece attached to the breast by a bolt. Figs. 25 and 26 are details to show the form of socket on the mold-board or removable piece. Figs. 27, 28, and 29 are detail views of my improved landside or heel. Figs. 30 and 31 are detail views of modified forms of the landside or heel, and Fig. 32 is a detail of the standard with various adjustments of the sweep indicated in dotted lines thereon.

The beam A is provided with the handles B and standard C, the latter having the moldboard D, share E, and landside or heel F.

While my improvements are shown in Fig. 1 as applied to a single turning-plow, it is evident that they are equally applicable to a double turning-plow, as shown in Fig. 13.

The first part of my invention relates to the construction of the standard and its combination with the beam and the devices employed to effect the various adjustments of the beam relatively to the standard. The standard is expanded at its upper end, to afford a better and more positive connection with the beam, and is provided with front and rear bearings, $a\ a'$, to which the beam is attached.

To reduce the weight of the standard, it is cast with the central portion between the bearings removed, so that the said bearings stand up like two arms and form the points of attachment of the standard with the beam.

Projected from the inner face of the standard, slightly to the rear of the front bearing, $a$, and in a plane lower than the point of attachment of the arm with the beam, is a beam-rest, P, which is the fulcrum upon which the beam tilts or moves laterally in its varied adjustments. The upper surface of the rest may be sloped to present but a single element to contact with the under side of the beam, and form the line about which the beam turns, or it may curve or slope gradually in opposite directions, presenting a curved or conical outline, so that a different portion of the rest will contact with the beam, according to the adjustment of the latter. The bearings $a\ a'$ are slotted, as shown, or they may be provided with a series of openings. These slots or openings $a^4\ a^5$ are arranged on the arcs of circles, of which the surface of or point of contact on the beam-rest is the center. This construction throws the upper ends of the slots nearer together and their lower ends wider apart, so that the adjustment of the beam vertically is by a tilting movement, by which one end must be raised in order to lower the other end. The slots are preferably curved, so that a nicer adjustment is secured; but they could be made straight and the same adjustments secured.

The standard is secured to the beam by bolts or studs $c^2\ b^2$, passing through the slotted bearings $a\ a'$, respectively, and through the beam. To effect an adjustment of the beam, the nuts on the ends of the bolts $c^2\ b^2$ are slackened, when the beam supported on the rest P may be partially turned about the same, giving thereto a seesaw or tilting motion, and when the proper adjustment has been made the beam may be fixed by turning home the nuts previously slackened, when the bearings of the standard will be clamped tightly to the beam. The inner face of these bearings may be roughened or provided with teeth, to render more positive the binding action of the bolts, and prevent the accidental slipping of the beam.

To more securely hold the beam to the standard and prevent its displacement, and guard against its leaving its rest when being adjusted, a bolt, $c^6$, passes vertically through the beam and through an opening, $p$, in the beam-rest. Said bolt holds the beam down, and relieves the strain on the bolts $c^2\ b^2$ and their respective bearings, and also prevents the beam from splitting at the point weakened by the transverse hole for the bolt $c^2$.

By the use of the two bolts, as described, the beam is secured both vertically and laterally to the standard, the points of attachment between the two are increased, and the beam, whenever adjusted and the nuts on the bolt screwed home, has greater firmness and stability given to its position than is given by the ordinary methods.

For the purpose of adjusting the beam laterally one of the bearings of the standard is beveled or inclined on its inner face at an angle to the length of the beam, and a wedge having one side correspondingly inclined is inserted between the bearing and the beam. As access can be had to the forward bearing, $a$, with greater facility than to the rear, it is preferred to have the inner face thereof inclined to the beam and the wedge inserted between it and the beam. The wedge has a longitudinal slot, $q$, to permit the passage of the bolt $c^2$, and a handle or lug, $Q'$, projecting laterally therefrom, to afford a means for the easy manipulation of the wedge when adjusting the same. The slot in the wedge is closed at both ends, so that it cannot drop off the bolt when the beam is loosened for purposes of adjustment or when it works loose while at work. It is thus at the place where it is used, and its loss is prevented. A lip or flange, $q'$, projecting from the upper edge of the wedge in a direction opposite the handle $Q'$, rests on the upper side of the beam and acts as a guide, to give proper direction to the wedge during its adjustments or when first inserted in place. This flange serves a triple purpose—namely, as a strengthening-rib to give greater durability to the wedge, as a guide in its longitudinal movement, and as a support to prevent it from dropping down when the beam is loosened.

In order that the wedge may not be accidentally displaced when once adjusted to a proper position during the adjustment of the beam to the standard, the wedge is provided with a tooth or point, $q^2$, to engage one of a series of grooves, $a^2$, formed in the arm or bearing on the side adjacent to the inclined side of the wedge. These grooves are located, preferably, above the curved slot $a^4$; but they may be located below or on either side of the slot $a^4$, and they may be straight or slightly curved, as desired. The grooves may be made on the wedge and the tooth be on the standard-bearing. The rear bearing, $a'$, is provided on its inner side with a curved guideway, $a^3$, which may be either countersunk in the arm or raised therefrom. The latter is desirable, as it strengthens the arm and forms a rib on either side of and encompasses the slot $a^5$. This guideway is curved on the arc of a circle having its center in the beam-rest or in the vertical bolt $c^6$. A corresponding ratchet-slide, $b$, is interposed between the bearing and beam and fits the guideway. The slide is provided with side flanges, $a^6$, to embrace and fit the sides of the guideway. These flanges serve to facilitate the adjustment of the beam and give strength to the slide. A lip or rest, $b'$, extending laterally from the lower edge of the slide fits against the lower side of the beam, and a bolt, $b^3$, passes vertically through this lip and through the beam, and holds the guide in place, and prevents the beam from splitting. The bolt $b^2$, which extends through the slot in the rear arm and transversely through the beam, passes through the opening $b^4$ in the slide. By reason of the bolt $b^3$ the slide will not drop from its place when the bolt $b^2$ is slackened to adjust the beam. The friction between the contacting surfaces of the slide and guideway will, when the parts are tightly clamped by the bolt, ordinarily hold the beam in an adjusted position; but for greater security, and to render the binding action more positive, it is preferred to provide the one with a series of teeth and the other with a single tooth, or both may be provided with a series of teeth; but in practice it is found best to provide the guideway with a series of teeth, $a^7$, and the slide with a single tooth, $b^5$, to engage the spaces between the teeth of the guideway.

It will be understood that to the effective operation and lateral adjustment of the draft end of the beam the latter is arranged to stand off from the standard, so that a space (marked $a^8$) intervenes, as shown in Figs. 8 and 9.

Having reference to Figs. 4 and 7, it will be noticed that the beam-rest P curves rearwardly and outwardly from the standard on its forward edge, thus forming a fender which throws off weeds, &c., and prevents the clogging of the plow. The beam-rest fills up, for all practical purposes, the gap and angle which would otherwise be formed between the beam and the bearing or side of the standard. As the draft end of the beam is adjusted laterally, it is found advantageous to make the face of the slide next the beam slightly convex, in order to avoid any binding on the corners of the guide. The slide will have a slight rocking or oscillating movement upon its retaining-bolt $b^3$. The opening $b^4$ for the transverse bolt should be centrally located between the edges of the slide, or so located as to pass through the apex of its convexed face.

While I have shown the beam-rest as made integral with the standard and slotted longitudinally to permit the lateral adjustment of the beam, it is manifest that the rest may project laterally from the beam and pass through an opening in the standard. This may be accomplished in various ways, one of which is to provide the bolt $c^6$ with a lateral arm, as shown in Fig. 5. In this case the bolt will be fixed relatively to the beam, and in the lateral adjustment thereof the arm $c^7$ of the bolt will slide in or out through the opening C' (indicated in dotted lines) in the standard. Another way is to provide the bolt $c^6$ with another leg, making a double or twin bolt, (see Fig. 6,) the lower portion of which passes through the opening in the standard, the additional leg being designed to come on the outside of the standard. The ends of the twin bolt are united by a yoke and nuts screwed down on the yoke to clamp the bolt securely in place.

While I prefer to have the lateral projection P, as shown, so that it serves as a beam-rest, yet it can be located at a lower point on the standard, (indicated by dotted lines at P', Fig. 4,) where it will serve to hold the bolt $c^6$ and permit both vertical and lateral adjustment of the beam; but if so located the adjustment of the beam would be more difficult, for while being adjusted the weight thereof would have to be sustained by the hands. By locating the lug so that it projects immediately under the beam, as shown, it serves as a fulcrum on which the beam tilts, and also as a fender to throw off trash.

It will be clearly understood from the foregoing description, and by reference to the drawings, that I have provided a plow-standard in which there are slotted bearings adapted to take vertical and transverse bolts, adapted to hold and permit vertical and lateral adjustment of the beam, and at the same time the said beam is held with greater firmness than it could be held by the ordinary arrangement of the bolts. The vertical and transverse bolts, arranged as I have them, coact and brace each other, so that the strain thereon is reduced to a minimum.

The lower end of the standard is mortised to provide a seat, $d$, to receive the wing $e$ of the share E and the landside or heel F. The mortise may be dispensed with, as will hereinafter appear. At the front end of the seat or mortise a groove, $d'$, is cut to receive a projection, feather, or rib formed on the side of the wing of the share.

Instead of forming a groove, $d'$, a slot could be cut through the standard, and the feather or rib would fit under the edge thus formed; or, if preferred, the small portion of the standard below the groove could be entirely removed. I prefer to make the standard, as shown, with a groove. At the rear end of the seat $d$ a series of grooves, $d^2$, are formed, which are deepest at their rear ends and run out to nothing at their forward ends. They are formed and arranged so as to converge at their forward ends. They receive the side flange of the heel or landside F, hereinafter more particularly described. Suitably-arranged bolt-holes are formed through the standard, as shown, to permit the attachment of the several parts of the plow.

The share E (shown in Fig. 1 as made for a single turn-plow and in Fig. 18 as made for a double turn-plow) has the depending wing $e$ adapted to slide alongside the standard and into the seat $d$. It has on its side a rib or feather, $e'$, which fits into the groove-channel $d'$ on the side of the standard. If the standard should be formed with a slot or be cut away, as hereinbefore indicated, the rib or feather $e'$ would project below the edge thus formed. The object of this construction is to provide a means on the adjacent sides of the wing and standard which will interlock when the said sides are brought together; nor is it necessary that the rib be on the share and the groove or channel be on the standard. The rib could be formed on the standard and the groove be in the wing. I prefer to make them as shown, because the groove, if formed in the wing, would tend to weaken this part and render it more liable to break. The rib or feather formed as shown adds greatly to the strength of the wing. I make the channel $d'$ tapering from its forward to its rear end, and form the rib correspondingly, so that the latter will slide more readily into the former, and better fitting of the parts together is secured. The rear end of the wing of the share is provided with a curved recess or seat at $e^2$, in which the end of the heel or landside fits snugly and turns, as hereinafter explained.

My improved heel or landside F is made preferably so that it may be inverted; but it has novel features which do not depend upon its capability of being inverted.

In Figs. 27, 28, and 29 the heel or landside is shown in its details of construction, whereby it is rendered invertible. The landside is made rounded at its forward end, so that it fits snugly into the curved recess in the rear end of the wing of the share and turns therein, so as always to preserve a close joint. Both sides of the landside are straight and parallel one with the other in cross-section. It may be made, if desired, thinner at its front end and gradually increase in thickness throughout its entire length; but, having both sides made alike, it may be inverted, so as to turn the worn edge to the upper side and the unworn edge down to the ground. It pivots by its front end on a bolt, and its rear end is held and adjusted by another bolt passing through an elongated hole, $d^3$, in the standard.

By having the landside-heel abut against the wing of the share I do away with the usual intervening metal projection on the standard. This intervening projection formed in ordinary plows is subject to wear the same as the landside or heel. When worn, and a new landside or heel be put on, an uneven surface is made which increases the resistance and draft. In my device I am enabled to always preserve an even surface. The landside or heel is formed preferably with two flanges, F F, on its opposite edges and projected in opposite directions. These flanges are widest at their rear ends and taper gradually to nothing. They extend nearly to the front end of the landside, and are sharpened, so as to fit snugly into one of the channels on the side of the standard. The under sides of the flanges are sloped upward, so as to fit a corresponding upward slope on the under side of the channel $d^2$. This correspondence in the said slopes causes the landside to slide into snug position against the side of the standard. Both edges being alike, the landside may be inverted, as hereinbefore indicated. The landside is strengthened by the flanges, so that its rear end is not liable to break off. The side flanges may be terminated at the rear edge of the standard, being trimmed off, as shown in Fig. 31. In this case the landside is strengthened, and the forward end of said flange would engage with the teeth formed on the rear edge of heel of the standard, instead of with the teeth on the side thereof.

Two methods may be provided for interlocking the landside when made as shown in Fig. 31. One is to form a small teat or lug on the side of the landside, which would engage in any one of a series of small holes or depressions formed in the side of the standard. The other is to form a series of notches in the rear edge of the standard-heel, as shown in Fig. 4, and have a small lug or catch provided on the side of the landside, or adapt the front end of the cut-away flange, Fig. 31, to engage in one or the other of the said heel-notches; but these two latter methods are not desirable, because the teats or lugs are liable to be worn off, and because in a manner unserviceable, and thereby throw the whole strain of holding the landside on the rear retaining-bolt. I prefer to make the flanges as shown in Fig. 28 and hereinbefore described, because the wear of the edge of the landside does not wholly destroy the interlocking feature of the flange.

The rear ends of the edges of the landside are slightly curved toward each other, as shown at $F^2$, Fig. 28. This is done to prevent any sharp corners from striking the earth when the landside is adjusted downward. A smooth and longer bearing-surface is presented and lies on the ground in whatever adjustment may be given to the landside.

I prefer to make the landside or heel with its rear bolt-opening, $F^3$, placed nearer one edge than the other, and when first put in position to turn the wider edge down. Then, when the lower edge is worn, the bolt-opening will be about on the middle line and the landside can be inverted, as hereinbefore explained.

The heel or landside hereinbefore described is applicable to any kind of a plow, whether it have a single mold-board, as shown in Fig. 13. I prefer to make the standard with a wing or wings, $g$, formed and adapted to support the share or mold-board or mold-boards, according to their number and location. Each wing is provided with a socket, $g'$, adapted to receive a corresponding projection, $D'$, on the rear side of the share or mold-board. The socket is formed with an extension, $g^2$, and a slot or elongated bolt-opening, $g^3$, is cut through the breast from the bottom of the socket and its extension, as shown in Fig. 23, and in Fig. 20, where the under side of the breast is shown. The purpose of this construction is, that the mold-board may be taken off without removing the retaining-bolt. By loosening the nut the retaining-bolt can be slipped into the elongation $g^2$, which will take the head out of the slotted lug or projection D on the mold-board, and thus permit the latter to be lifted off the wing.

The lug or projection $D'$ is provided with a socket or recess, $D^2$, to receive the head of the retaining-bolt. The recess is preferably closed at one end, though this is not necessary for the single purpose of securing the parts together; but for greater strength and durability the inner end is closed, and the said inner end, $D^3$, of the recess is extended under the metal which closes the said end. The extension of the inner end of the recess under the metal forms an overhanging ledge, $D^4$, under which the inner part of the head of the bolt $D^5$ will catch. By this construction the head of the bolt is supported on the inner end and in the two sides, thus giving to it a three-fold support, which prevents the breaking of the sides of the projection.

The recess may be formed to receive an ordinary rectangular bolt-head; but I prefer to make it with sloping sides, as shown, and the head of the bolt is sloped correspondingly. The recess is also tapered from its open to its inner end, so that the said inner end is narrower transversely than the said open end. This construction is shown in Fig. 25.

The bolt, adapted to the hereinbefore-described tapered recess, is shown at $D^5$, Fig. 21. The head is elongated and narrower at one end than at its other end, and has its sides and inner ends of its outer face beveled, as shown, to correspond with the slope of the sides and end of the recess $D^2$. If the recess $D^2$ were straight and not tapered from its outer to its inner end, a rectangular head on the bolt would slide thereinto; but even with a straight recess I prefer to use the tapered head, for it will then slide past any projections, roughness, or other imperfections which may have been made when the piece was cast. The long bolt-head shown gives more bearing or a longer bearing; hence the metal on the sides of the socket is not so liable to pull off under the strain. The wedge-shaped or tapered head can be driven into the tapered or other formed socket and make a closer fit, and will hold tighter than the rectangular head in a socket having parallel sides.

In Fig. 13 two sweeps and their stocks are shown arranged on opposite sides of the standard, and held with capability of adjustment independently of each other.

Both sweeps being alike in construction and operation, the description of one will answer for the other.

Each sweep is provided with a stock or shank, which lies against and is movable on the side of the standard.

I prefer to make each sweep and its stock in separate pieces; but they may be made integral. The sweeps in their adjustment relatively to the standard are not dependent upon their being movable on their stocks.

I prefer to make each sweep in two parts—namely, the sweep-blade and a stock or shank—whereby the blade is held in place on the standard.

My sweeps have three adjustments: first, they may be raised or lowered in a vertical plane; second, they may be turned pivotally to any pitch or angle on their bolt-fastening without moving the latter, and, third, they may be set forward or back, so as to bring them nearer to or farther from the mold-board. In the first and second of these adjustments a single bolt may be used to hold both sweeps, and each of the latter may be adjusted independently of each other without changing the position of the bolt. In the third adjustment, if both be held by the same bolt both must be moved together, but they may be separately by employing another bolt.

I will describe the construction of one of the sweeps. The sweep-stock S is constructed with a shank, S', which lies against the side of the standard. It is provided with a slot, $S^2$, through which the retaining-bolt C' is put. The bolt passes through one of a series of holes or through a slot in the standard. On the inner side of the shank of the stock a series of teeth, $S^3$, are formed and arranged on opposite sides of the slot $S^2$, and are adapted to engage lugs on the standard. A sweep-supporting arm, $S^4$, projects from the lower end of the shank S', and is provided near its inner end with a curved shoulder, $S^5$, concentric with the bolt-hole $S^6$. A small conical or other formed tooth, $S^7$, is projected from the arm, and is adapted to engage the sweep T, and holds the latter in any desired adjustment, as hereinafter described.

The standard, in order to permit the attachment and adjustment of the sweep, is provided with a series of bolt-holes, $C^2$, arranged preferably in a straight line from front to rear. Instead of holes a slot, as indicated in dotted lines, could be used. On opposite sides of the bolt holes or slot lugs $C^2$ are formed. These lugs may be of any desired shape; but I prefer to make them oval or diamond shaped, as this shape gives more bearing when making the desired adjustments. The teeth on the sweep-stock engage on the lugs and prevent the sweep from turning. The sweep-stock may be rotated on the retaining-bolt without changing the position of the latter, whereby the pitch and set at different angles, whereby the pitch of the sweep is changed. The lugs $C^3$ could be formed on the shank of the sweep-stock, and the teeth of sweep-stock could be formed on the standard. Again, instead of the teeth and lugs, as shown, depressions or sockets could be formed in one part adapted to receive projections formed on the other part. By the use of the lugs the nut on the bolt C' need not be drawn down tightly. The sweep-stock could be held by the bolt and its nut without the aid of the lugs by turning the nut on very tightly; but I prefer the lugs and teeth, as shown. If the lugs were made rectangular in form, the sweep-stock could be adjusted to a limited extent, as hereinbefore described.

To secure the greatest desired adjustment and bearing, I form elongated lugs having an oval or diamond shape. By such form I secure a considerable length of bearing-surface, and at the same time the angle or slope of the sides permits all adjustment necessary. A round lug would give fair but not perfect results. The sweep T has its inner end, T', made plane on both sides, so that either side may be placed on and fit snugly to the upper face of the arm $S^4$. It can be inverted or turned over so as to bring either side to the front, or it can be used on the sweep-stock on the other side of the standard. It is also curved on its end concentric with its bolt-hole $T^2$, and fits snugly against the shoulder $S^5$ on the sweep-stock. It may be turned on its bolt and set at different angles, so as to raise or lower the outer end. A series of holes, $T^3$, arranged in the arc of a circle concentric with the bolt $T^2$, is formed in the sweep, and in such location as to engage upon the tooth $S^7$. These holes may be made entirely through the sweep, or may be made only part way through. When made part way through, holes on the opposite sides will be made. Instead of the single-pointed tooth and the holes, as described, there may be employed the well-known radial teeth on one of the parts, adapted to engage in the corresponding depressions on the other part, such as are shown in former patents granted to me. I prefer to use the conical-shaped tooth and form the holes entirely through the sweep. The holes will necessarily get filled with dirt. If the holes were only part way through, the sweep would have to be entirely removed from the stock and the dirt removed before a different adjustment could be made. In the construction shown the dirt will be pushed out of the hole by the pointed tooth, so that it is not necessary to take the sweep off the stock to make new adjustments. The sweep is concavo-convex in cross-section, as shown at $T^4$, Fig. 17. The sweep being invertible, so that either of its faces may be presented to the front, it is adapted to do a greater variety of work than any of the ordinary sweeps. If the convex side be to the front, the earth will slip easily over it and drop behind without being greatly stirred. If the concave side be to the front, the earth will be lifted in such a manner as to cause it to be greatly disintegrated and stirred, and moved with more force to supply the plant cultivated with more earth. Again, it often occurs that the earth should be more disintegrated at the middle of the space between two rows of plants than next the row, or vice versa.

One of the sweeps can be removed and inverted in a very brief time, and the plow be prepared to do the two different kinds of work. These sweeps are not only invertible, but are also reversible, and may be used on either sweep-stock.

When both sweep-stocks are put in place, as in Fig. 13, the heel or landside stands between them, or, rather, between one of them and the standard. If the landside should be a plain straight bar without side projections, it could be moved up or down without disturbing the sweep next it. When constructed with the side flanges, it could be adjusted by first loosening the bolt which holds the stock, and then turning the latter out of the way, to permit the requisite side movement of the landside to disengage the interlocking means.

I have shown the standard mortised at its lower end to receive the wing of the share and the landside or heel. This is the preferred construction; but the standard could be made with a plane face and the landside and the wing of the share would rest against the same. The end of the landside in either construction fits neatly into the concavity in the end of the wing of the share and makes a close joint. This prevents the wearing away of the standard between the landside and share, as is the case in those plows where a portion of the standard intervenes between the front end of the landside and the share, as hereinbefore explained. The handles B have their lower ends secured to the standard below the beam, and are supported by a brace, B', Fig. 2, which has its end B² bent downward at an angle and slotted to receive the end of the retaining-bolt $c^2$. The slot permits the bolt to slide upward therein when the beam is adjusted, and at the same time the brace continues its support of the handles. It will be seen that the sweeps are not only adjustable vertically and to any inclined position, the one independently of the other, but that they may be moved to or from the mold-boards, so as to bring them close under the rear edge of the latter or far to the rear, so as to give a wide intervening space between them and said mold-board. By using a separate bolt for each sweep one of the latter may be set close to the mold-board and the other farther to the rear. If the sweep and its stock be made integral, as shown in Fig. 23, it may be inverted by turning the shank downward and reversing the sweep to the opposite side of the standard. Such an adjustment permits the sweep to be set in a higher position, which is often desirable. The same change of position may be given to the adjustable sweep and its stock.

By means of the slot or series of holes $C^2$, arranged on an incline upward and backward from the share or mold-board, the sweep or sweeps may be moved backward and upward without changing the pitch thereof, as is done in my Patent No. 120,076, June 16, 1872. The different pitch for the sweep is secured by turning its stock pivotally on its bolt. These adjustments adapt the sweep to carry more or less earth, as may be desired, and cut near to or far from the bottom of the furrow.

Having thus described my invention, what I claim, and desire to secure by Letters Patent, is—

1. The combination, with the standard having front and rear beam-supports, one or both of which are extended vertically alongside of the beam, of a vertically-tilting beam secured to and having its fulcrum or center of motion located between the beam-supports, and a bolt or fastening arranged at the tilting-point or center of motion, whereby the beam is securely held at said point or center, substantially as set forth.

2. The combination, with the standard provided with front and rear beam-supports slotted inversely to each other, and having a beam rest or fulcrum projected laterally under the beam and arranged between the beam-supports, of a beam arranged alongside the beam-supports and tilting on the intermediate beam-rest, substantially as set forth.

3. The combination of the beam, the standard projected along the side thereof, and a wedge adjustably inserted between the side of the beam and the standard, said wedge having a flange to extend over and rest upon the upper side of the beam, substantially as and for the purposes set forth.

4. The combination of a standard having front and rear bearings, and a beam-rest laterally projected therefrom between the bearings, a beam resting on said beam-rest and against the bearings, bolts passed transversely through the beam and bearings, and a bolt extending vertically through the beam and beam-rest.

5. The combination of the standard having front and rear bearings, and a beam-rest projected laterally therefrom, a bolt passed vertically through the beam and beam-rest, and a bolt passed transversely through the beam and the standard-bearing.

6. The combination of the standard having front and rear bearings, and a laterally-projecting beam-rest, a beam supported on said rest and free to have a pivotal and lateral adjustment thereon, and bolts to secure the beam vertically and laterally to the standard, substantially as described.

7. In combination, the standard having a lateral stud, a beam pivotally secured to and supported by the stud, a wedge adjustably interposed between the standard and beam, to adjust the latter laterally, and bolts passed transversely through the beam and standard to bind the parts together, substantially as set forth.

8. The combination of the standard having front and rear bearings, one or both of which are provided with raised guideways, the beam, and a guide having lateral flanges to embrace and fit the sides of the guideway, substantially as set forth.

9. The combination of the standard, the beam vertically adjustable, a wedge interposed between the beam and standard and adjustable vertically and horizontally, the standard and wedge being provided with approximately-vertical grooves formed in the one and an interlocking tooth or teeth formed on the other.

10. In a plow, a standard provided with a front bearing, and with a rear support or bearing, a beam pivotally adjustable, a transverse bolt for securing the beam to the front bearing, a vertical bolt held in the standard and passed through the beam at the pivotal center thereof, and means for pivotally adjusting the beam.

11. The combination, with a beam having a vertical oscillating or tilting movement, of a standard having bearings arranged in front and rear of the center of motion of the beam, and provided with curved guideways or slots having their centers in the center of motion of the beam.

12. In a plow, a vertically-tilting beam, in combination with a standard extending alongside thereof, and provided with a slotted arm to support and form the fulcrum about which the beam tilts, a bolt passing vertically through the slotted arm and beam, to hold the latter in contact with the arm, and movable laterally with the beam when adjusted sidewise, and a transverse bolt to hold the rear edge or portion of the standard in a nearly-fixed relative position during the lateral adjustment of the beam relative to the forward edge of the standard, substantially as set forth.

13. The combination of the tilting beam, a standard lapped alongside thereof, a bolt passing transversely through the standard and beam, a guide-bearing interposed between the standard and the side of the beam and provided with a lip lapping upon the beam, and a bolt passing vertically through the lip and beam, to hold the guide-bearing in place and strengthen the beam against the lateral strain of the transverse bolt, substantially as set forth.

14. In a plow, a standard having a front bearing extended upward alongside the beam, and having a lateral stud or arm integral therewith, and projected below and close to the under side of the beam and curved or rounded on its front face, whereby the angle between the beam and standard is closed, and the lodgment of trash and foreign substance is prevented, substantially as set forth.

15. The herein shown and described wedge, longitudinally slotted, and having a flange or lip projected laterally from its upper edge to guide its movement, substantially as described.

16. In a plow, the combination, with the standard having indentations formed in the side thereof, near its lower end, of an invertible landside having a rib projected from its side to engage one of the said indentations in the standard, substantially as and for the purposes set forth.

17. The combination, with the standard having teeth or indentations formed therein, of a landside or heel pivoted by its front end, and provided with corresponding teeth or corrugations to interlock with those of the standard, and an adjusting-bolt, substantially as set forth.

18. The combination, with the standard having on its side one or more teeth, corrugations, or indentations, of a landside pivoted at its forward end to the standard, and provided with a lateral flange or tooth projected at or near its edge, to engage the toothed or corrugated or indented surface of the standard, substantially as set forth.

19. The combination, with the standard having a series of teeth or corrugations radially formed on its side, of an invertible landside having lips or flanges of corresponding shape formed on its opposite sides and projected from its opposite edges, and adapted to engage the radially-formed teeth on the standard, and an adjusting-bolt, substantially as set forth.

20. The combination, with the standard and the mold-boards or share, of the sweeps secured to the standard and adjustable horizontally to and from the mold-board independently of each other, substantially as shown and described.

21. The combination of the standard provided with a bolt hole or slot and having lugs adjacent to said slot, a sweep having a shank against the side of the standard and slotted vertically, and provided with a series of teeth to engage the lugs, and a bolt passing through the slot or hole in the standard and sweep-shank, whereby the sweep may be adjusted vertically and pivotally on the bolt at one and the same operation.

22. The combination of the standard having a series of openings therethrough and lugs adjacent to said openings, a sweep on each side of the standard and having teeth to interlock with the lugs, and a bolt passing through one of the openings in the standard, to secure the sweeps in place and form the center about which the sweeps have a pivotal adjustment independent of each other, substantially as specified.

23. The combination, with the standard provided with a landside-seat formed in its sides at its lower end and provided with a bolt-hole arranged above the said seat, of a sweep-stock (having its shank slotted) vertically adjustable and held by a suitable bolt to the standard, and the landside pivoted by its forward end within the seat and adjustable vertically at its rear end between the standard and the shank of the sweep-stock, substantially as shown and described.

24. The combination, with the sweep-stock having a sweep-supporting arm provided with a spur and a bolt-hole, of the reversible and invertible sweep provided with a bolt-hole corresponding to that in the arm, and having a series of holes on each side arranged in the arc of a circle concentric with the bolt-hole, and adapted to engage with the spur and positively hold the sweep in its adjusted position, substantially as shown and set forth.

25. The sweep hereinbefore described, having its outer end made concavo-convex and its inner end adapted to be inverted on its seat, whereby the concave or the convex surface may be turned to the front, substantially as set forth.

26. The combination, with the standard having a wing, $g$, provided with a socket, $g'$, and a removable mold-board or casting having a slotted and recessed projection, $D'$, formed on its back, the sides of the recess converging, of a retaining-bolt having an enlarged head tapered in conformity to the taper of the recess $D^2$ in the projection, substantially as shown, and for the purposes set forth.

27. The combination, with a wing, $g$, having a socket, $g'$, formed therein, and a bolt-opening, $g^3$, cut through from the bottom of the socket, of a plow-casting having a projection, $D'$, fitted into the socket and recessed for the passage of a bolt, the inner side, $D^4$, of the bolt-opening being sloped inward, and a bolt, $D^5$, having its head correspondingly sloped to engage the inner sloped end, $D^4$, of the recessed projection, substantially as shown and described.

In testimony whereof I affix my signature in presence of two witnesses.

LEWIS B. WHITE.

Witnesses:
JNO. A. MORGAN,
T. B. JACKSON.